US010440470B2

(12) United States Patent
Park et al.

(10) Patent No.: US 10,440,470 B2
(45) Date of Patent: Oct. 8, 2019

(54) ELECTRONIC DEVICE INCLUDING SPEAKER

(71) Applicant: Samsung Electronics Co., Ltd., Gyeonggi-do (KR)

(72) Inventors: Soo Hyun Park, Gyeonggi-do (KR); Joo Hyun Kim, Seoul (KR); Doo Sun Yoon, Gyeonggi-do (KR); Seung Bum Choi, Gyeonggi-do (KR); Min Woo Yoo, Gyeonggi-do (KR); Jong Chul Choi, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 15/892,047

(22) Filed: Feb. 8, 2018

(65) Prior Publication Data

US 2018/0227668 A1 Aug. 9, 2018

(30) Foreign Application Priority Data

Feb. 8, 2017 (KR) .................. 10-2017-0017722

(51) Int. Cl.
  *H04R 1/42* (2006.01)
  *H04R 1/02* (2006.01)
  *H04R 1/44* (2006.01)
  *H04R 1/28* (2006.01)
  *H04R 29/00* (2006.01)

(52) U.S. Cl.
  CPC .............. *H04R 1/42* (2013.01); *H04R 1/028* (2013.01); *H04R 1/44* (2013.01); *H04R 1/2857* (2013.01); *H04R 29/001* (2013.01); *H04R 2201/02* (2013.01); *H04R 2499/11* (2013.01)

(58) Field of Classification Search
  CPC ........ H04R 1/42; H04R 1/028; H04R 1/2857; H04R 2201/02; H04R 2499/11
  See application file for complete search history.

(56) References Cited

U.S. PATENT DOCUMENTS 7,176,700 B2 * 2/2007 Itakura ................. G01N 27/223
  324/670
7,848,108 B1 * 12/2010 Archambeault .... H01L 23/3677
  165/185

(Continued)

FOREIGN PATENT DOCUMENTS

KR  1020050121033  12/2005
KR  1020140113789  9/2014

(Continued)

OTHER PUBLICATIONS

International Search Report dated Apr. 30, 2018 issued in counterpart application No. PCT/KR2018/001639, 12 pages.

*Primary Examiner* — Mohammad K Islam
(74) *Attorney, Agent, or Firm* — The Farrell Law Firm, P.C.

(57) ABSTRACT

Disclosed is an electronic device including a housing; a speaker configured to output a sound signal; an enclosure surrounding the speaker and including a pipe passage, through which the sound signal moves in a direction facing an opening formed in the housing; a heat emitting structure mounted on an inner surface or an outer surface of the enclosure; a sealing member attached to the pipe passage; and a processor physically or electrically connected to the heat emitting structure and configured to control emission of heat.

19 Claims, 11 Drawing Sheets

(56) References Cited

U.S. PATENT DOCUMENTS

| | | |
|---|---|---|
| 8,773,271 B1 | 7/2014 | Stevens et al. |
| 9,071,046 B2 | 6/2015 | Stevens et al. |
| 9,146,207 B2 | 9/2015 | Harper et al. |
| 9,157,880 B2 | 10/2015 | Stevens et al. |
| 9,225,105 B2 | 12/2015 | Cheong et al. |
| 9,559,514 B2 | 1/2017 | Stevens et al. |
| 9,733,680 B1* | 8/2017 | Voth .................. G06F 1/203 |
| 9,897,696 B2 | 2/2018 | Lee et al. |
| 2007/0037506 A1* | 2/2007 | Lee .................. F04D 33/00 454/184 |
| 2007/0261912 A1* | 11/2007 | Langberg .................. H04R 7/04 181/171 |
| 2007/0280497 A1* | 12/2007 | Isberg .................. H04R 1/225 381/345 |
| 2012/0063077 A1* | 3/2012 | Tomobe .................. H04M 1/0264 361/679.01 |
| 2012/0129061 A1 | 5/2012 | Nishikawa et al. |
| 2013/0182360 A1 | 7/2013 | Stevens et al. |
| 2014/0191874 A1 | 7/2014 | Stevens et al. |
| 2014/0192480 A1* | 7/2014 | Winkler .................. G06F 1/203 361/679.47 |
| 2014/0273617 A1* | 9/2014 | Cheong .................. H01R 13/5213 439/521 |
| 2014/0313039 A1 | 10/2014 | Stevens et al. |
| 2015/0001200 A1 | 1/2015 | Harper et al. |
| 2015/0049886 A1* | 2/2015 | Daley .................. H04R 19/02 381/191 |
| 2015/0146911 A1* | 5/2015 | Vieites .................. H04R 9/043 381/398 |
| 2015/0245122 A1* | 8/2015 | Rayner .................. H04R 1/2834 381/152 |
| 2015/0303680 A1 | 10/2015 | Stevens et al. |
| 2015/0382305 A1 | 12/2015 | Drincic |
| 2016/0004283 A1* | 1/2016 | Ganguly .................. G06F 1/1656 307/118 |
| 2016/0019773 A1 | 1/2016 | Stevens et al. |
| 2016/0020599 A1 | 1/2016 | Harper et al. |
| 2016/0021443 A1* | 1/2016 | Lee .................. H04R 1/023 381/334 |
| 2016/0116443 A1* | 4/2016 | Choi .................. G01M 3/24 73/579 |
| 2016/0146935 A1 | 5/2016 | Lee et al. |
| 2016/0241938 A1* | 8/2016 | Huang .................. H04R 1/023 |
| 2016/0345113 A1 | 11/2016 | Lee et al. |

FOREIGN PATENT DOCUMENTS

| | | | |
|---|---|---|---|
| KR | 1020150082041 | 7/2015 | |
| KR | 1020150082043 | 7/2015 | |
| KR | 1020160049794 | 5/2016 | |
| WO | WO 2015/105531 | 7/2015 | |
| WO | WO-2015105531 A1 * | 7/2015 | ............. H02H 5/083 |
| WO | WO-2017-173544 * | 3/2017 | ............. H04R 1/026 |

* cited by examiner

ELECTRONIC DEVICE INCLUDING SPEAKER

PRIORITY

This application claims priority under 35 U.S.C. § 119(a) to Korean Patent Application Serial No. 10-2017-0017722, which was filed in the Korean Intellectual Property Office on Feb. 8, 2017, the entire content of which is incorporated herein by reference.

BACKGROUND

1. Field of the Disclosure

The present disclosure relates generally to an electronic device including a speaker.

2. Description of Related Art

Electronic devices, such as smartphones or tablet PCs, may perform various functions, such as voice communication, transmission and reception of messages, capturing pictures, and playback of videos. In recent years, various electronic devices with waterproof and anti-vibration functions that allow use around or in water have been developed.

After the electronic devices with a waterproof function has been used around or in the water, residual moisture may be left in a portion of the electronic device. For example, residual moisture may be left on the display, around a charging terminal, on an earphone terminal, or on a speaker.

When residual moisture is left in the electronic device, the electronic device may malfunction or break down. For example, if moisture is left around the speaker, a sound signal output may be distorted and the speaker device may break down.

In the electronic device according to the related art, moisture may be left in a pipe passage, through which a sound signal is output, or moisture may be left in an opening for outputting a sound around the speaker may be left after the electronic device is used in or around water. Accordingly, the output sound may be distorted or sound quality may deteriorate.

SUMMARY

In accordance with an aspect of the present disclosure, an electronic device includes a housing; a speaker configured to output a sound signal; an enclosure surrounding the speaker and including a pipe passage, through which the sound signal moves in a direction facing an opening formed in the housing; a heat emitting structure mounted on an inner surface or an outer surface of the enclosure; a sealing member attached to the pipe passage; and a processor physically or electrically connected to the heat emitting structure and configured to control emission of heat.

In accordance with an aspect of the present disclosure, an electronic device includes a speaker configured to output a sound signal; an enclosure surrounding the speaker; a printed circuit board, on which one or more integrated circuits (IC) chips are mounted; and a heat transfer unit connecting the printed circuit board and an outer surface of the enclosure.

In accordance with an aspect of the present disclosure, an electronic device includes a speaker configured to output a sound signal; an enclosure surrounding the speaker; and a processor configured to control the speaker and increase the temperature of the speaker by outputting a preset non-audible signal through the speaker when it is determined that moisture is introduced into the enclosure.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
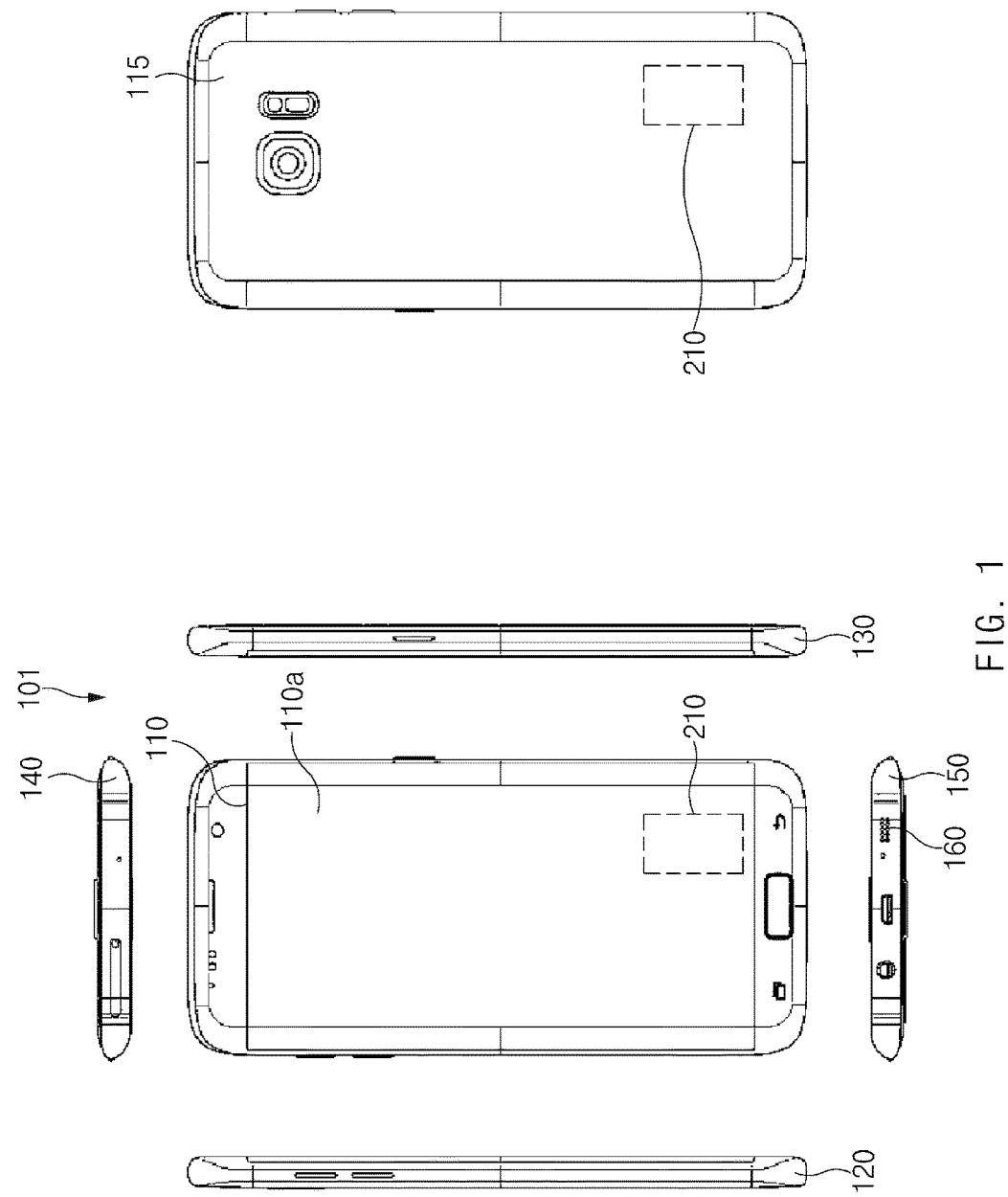
FIG. 1 is a view illustrating an external appearance of an electronic device, according to various embodiments of the present disclosure.

Those of ordinary skill in the art will recognize that modifications, equivalents, and/or alternatives on the various embodiments described herein can be made without departing from the scope and spirit of the present disclosure. With regard to the description of drawings, similar components may be marked by similar reference numerals.

In the present disclosure, the expressions "have", "may have", "include", "comprise" "may include", and "may comprise" used herein indicate existence of corresponding features (e.g., elements such as numeric values, functions, operations, or components) but do not exclude presence of additional features.

In the present disclosure, the expressions "A or B", "at least one of A and/or B", "one or more of A and/or B", etc. used herein may include any and all combinations of one or more of the associated listed items. For example, the term "A or B", "at least one of A and B", or "at least one of A or B" may refer to all of (1) where at least one A is included, (2) where at least one B is included, or (3) where both of at least one A and at least one B are included.

Terms such as "first", "second", etc. used herein may refer to various elements of various embodiments of the present disclosure, but do not limit the elements. Such terms are used only to distinguish an element from another element and do not limit the order and/or priority of the elements. For example, a first user device and a second user device may represent different user devices irrespective of sequence or importance. Without departing the scope of the present disclosure, a first element may be referred to as a second element, and similarly, a second element may be referred to as a first element.

It is understood that when an element (e.g., a first element) is referred to as being "(operatively or communicatively) coupled with/to" or "connected to" another element (e.g., a second element), it can be directly coupled with/to or connected to the other element or an intervening element (e.g., a third element) may be present. In contrast, when an element (e.g., a first element) is referred to as being "directly coupled with/to" or "directly connected to" another element (e.g., a second element), it should be understood that there are no intervening element (e.g., a third element).

The expression "configured to" used in the present disclosure may be used interchangeably with the expressions "suitable for", "having the capacity to", "designed to", "adapted to", "made to", or "capable of". The term "configured to (or set to)" does not mean only "specifically designed to" in hardware. Instead, the expression "a device configured to" may mean that the device is "capable of" operating together with another device or other components. For example, a "processor configured to (or set to) perform A, B, and C" may mean a dedicated processor (e.g., an embedded processor) for performing a corresponding operation or a generic-purpose processor (e.g., a central processing unit (CPU) or an application processor (AP)) which may perform corresponding operations by executing one or more software programs which are stored in a memory device.

Terms used in the present disclosure are used to describe embodiments and are not intended to limit the scope of the present disclosure. The terms of a singular form may include plural forms unless otherwise specified. Unless otherwise defined herein, all the terms used herein, which include technical or scientific terms, may have the same meaning that is generally understood by a person skilled in the art. It is further understood that terms, which are defined in a dictionary and commonly used, should also be interpreted as is customary in the relevant related art and not in an idealized or overly formal detect unless expressly so defined herein in various embodiments of the present disclosure. In some cases, even if terms are terms which are defined in the present disclosure, they may not be interpreted to exclude embodiments of the present disclosure.

An electronic device according to various embodiments of the present disclosure may include at least one of smartphones, tablet personal computers (PCs), mobile phones, video telephones, electronic book readers, desktop PCs, laptop PCs, netbook computers, workstations, servers, personal digital assistants (PDAs), portable multimedia players (PMPs), motion picture experts group (MPEG-1 or MPEG-2) audio layer 3 (MP3) players, mobile medical devices, cameras, and wearable devices. The wearable devices may include accessories (e.g., watches, rings, bracelets, ankle bracelets, glasses, contact lenses, or head-mounted devices (HMDs)), cloth-integrated types (e.g., electronic clothes), body-attached types (e.g., skin pads or tattoos), or implantable types (e.g., implantable circuits).

According to various embodiments of the present disclosure, the electronic device may be a home appliance. The home appliance may include, for example, at least one of a television (TV), a digital versatile disk (DVD) player, an audio player and recorder, a refrigerator, an air conditioner, a cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ or PlayStation™), an electronic dictionary, an electronic key, a camcorder, or an electronic panel.

According to an embodiment of the present disclosure, the electronic device may include at least one of various medical devices (e.g., portable medical measurement devices (e.g., a blood glucose meter, a heart rate measuring device, a blood pressure measuring device, and a body temperature measuring device), a magnetic resonance angiography (MRA) device, a magnetic resonance imaging (MRI) device, a computed tomography (CT) device, a photographing device, and an ultrasonic device), a navigation system, a global navigation satellite system (GNSS), an event data recorder (EDR), a flight data recorder (FDR), a vehicular infotainment device, electronic devices for vessels (e.g., a navigation device and a gyro compass), avionics, a security device, a vehicular head unit, an industrial or home robot, an automatic teller machine (ATM), a point of sales (POS) device, or an Internet of things (IoT) device (e.g., a light bulb, various sensors, an electricity or gas meter, a spring cooler device, a fire alarm device, a thermostat, an electric pole, a toaster, a sporting apparatus, a hot water tank, a heater, and a boiler).

According to various embodiments of the present disclosure, the electronic device may include at least one of a furniture or a part of a building/structure, an electronic board, an electronic signature receiving device, a projector, or various measurement devices (e.g., a water service, electricity, gas, or electric wave measuring device). The electronic device may be one or a combination of the aforementioned devices. The electronic device may be a flexible electronic device. Further, the electronic device is not limited to the aforementioned devices, but may include new electronic devices produced due to the development of new technologies.

The term "user" used herein may refer to a person who uses an electronic device or may refer to a device (e.g., an artificial intelligence electronic device) that uses an electronic device.

FIG. 1 is a view illustrating an external appearance of an electronic device, according to various embodiments of the present disclosure.

Referring to FIG. 1, a front surface 110 of the electronic device 101 may include a display 110a. The display 110a may be a touchscreen that recognizes a touch input of the user. According to various embodiments of the present disclosure, the front surface 110 of the electronic device 101 may include at least one of a camera, a light, a home key, and a soft key. A rear surface 115 of the electronic device 101 may include a camera or a flash.

According to various embodiments of the present disclosure, left side surface 120, right side surface 130, upper side surface 140, and lower side surface 150 of the electronic device 101 may include a physical button, a display, or a touchscreen. One side surface (e.g., a lower side surface 150) of the electronic device 101 may include a terminal, to which an earphone is connected, a data communication (e.g., a universal serial bus (USB)) terminal, or a terminal, to which a power source cable is connected. One side surface (e.g., the lower side surface 150) of the electronic device 101 may include an opening 160, through which a sound signal may be output. The opening 160 may be connected to a sound output module 210 (e.g., a speaker) located within a housing of the electronic device 101 through a pipe passage. For example, a sound output from the sound output module in the interior of the electronic device 101 may be emitted to the outside of the electronic device 101 through the opening 160.

Although FIG. 1 illustrates that the opening 160 is formed on the lower side surface 150, the present disclosure is not limited thereto. The opening 160 may be formed on a rear surface 115, left side surface 120 and right side surface 130, and an upper side surface 140 of the electronic device 101.

The electronic device 101 may include a sound output module 210 in the interior thereof. The sound output module 210 may be a device that converts an electrical signal generated by a processor or the like in the interior of the electronic device 101 to a sound signal and output the sound signal. The sound signal generated through the sound output module 210 may be output through the opening 160.

Figure 2:
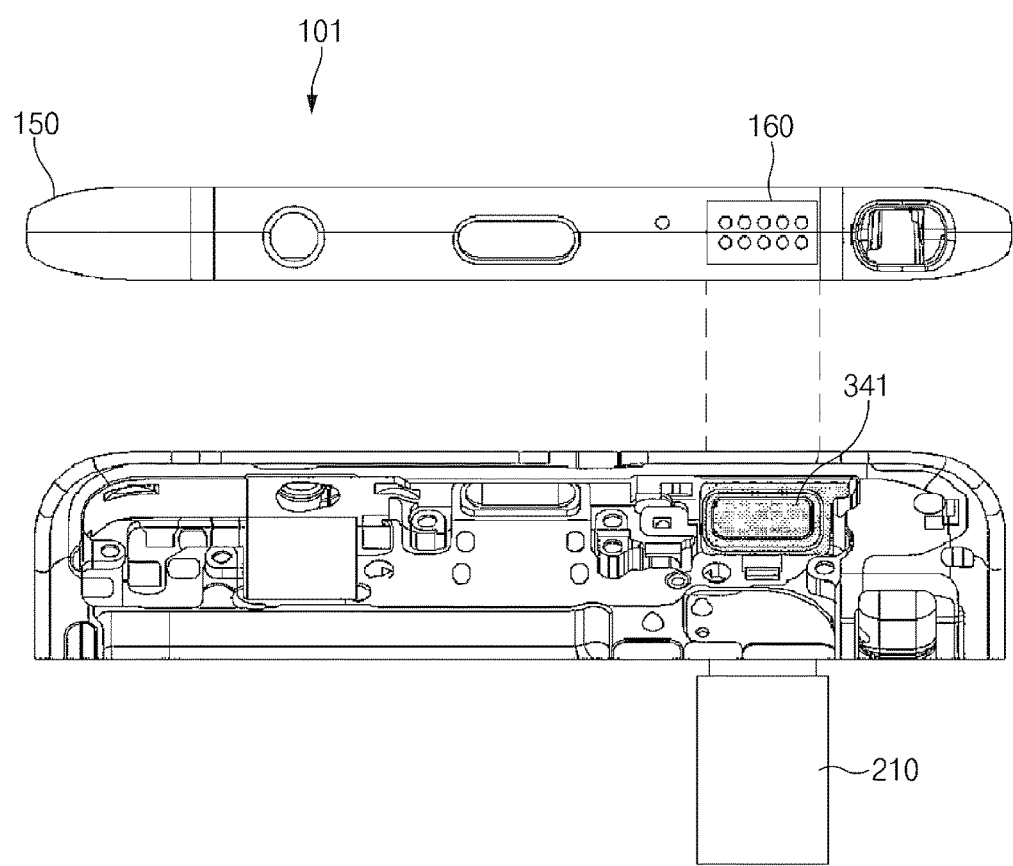
FIG. 2 is a diagram of a periphery of a sound output module, according to various embodiments of the present disclosure.

FIG. 2 is a diagram of a periphery of a sound output module, according to various embodiments of the present disclosure.

Referring to FIG. 2, the electronic device 101 may include an opening 160 on one side surface thereof. The opening 160 may be disposed adjacent to a pipe passage (or a passage, a hole, etc.), through which a sound signal is output from the sound output module 210 in the interior of the electronic device 101. The opening 160 may be formed in the form of a plurality of holes. A mesh net 341 may be attached to a middle area of the pipe passage. The mesh net 341 may interrupt foreign substances, such as moisture or dust, which are introduced from outside of the electronic device 101. According to an embodiment of the present disclosure, the sound output module 210 may be connected to an inner surface (e.g., a surface of the electronic device 101 which faces the interior thereof) of the opening 160.

The sound signal generated by the sound output module 210 may be output through the pipe passage (or a passage, a hole, etc.) formed between the opening 160 and the sound output module 210.

When the electronic device 101 supports a waterproof function, moisture may be introduced through the opening 160. The moisture may be introduced to a sound space for outputting the sound signal in the interior of the sound output module 210. Even when the user normally uses the electronic device 101 after the submersion has ended, the residual moisture may be left in the interior of the sound output module 210.

Figure 3A:
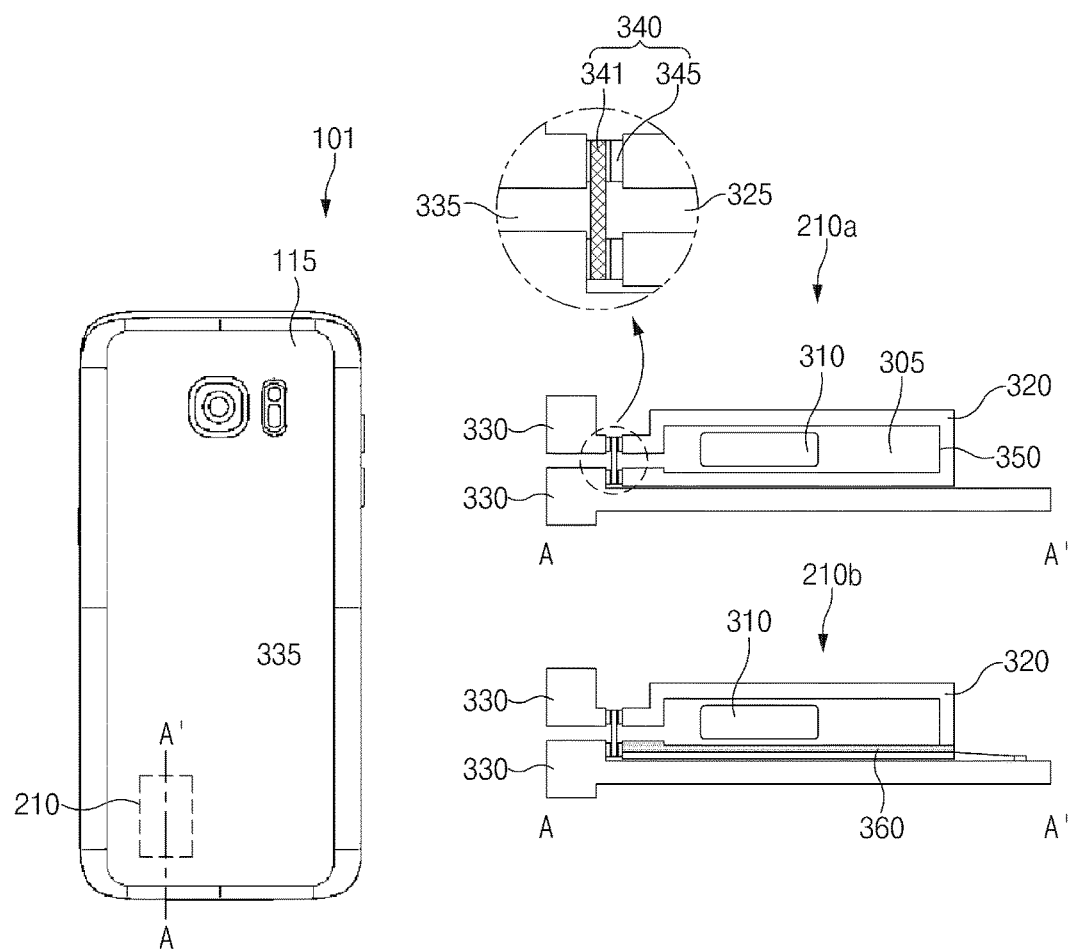
FIGS. 3A and 3B are sectional views of a sound output module, according to various embodiments of the present disclosure.
Figure 3B:
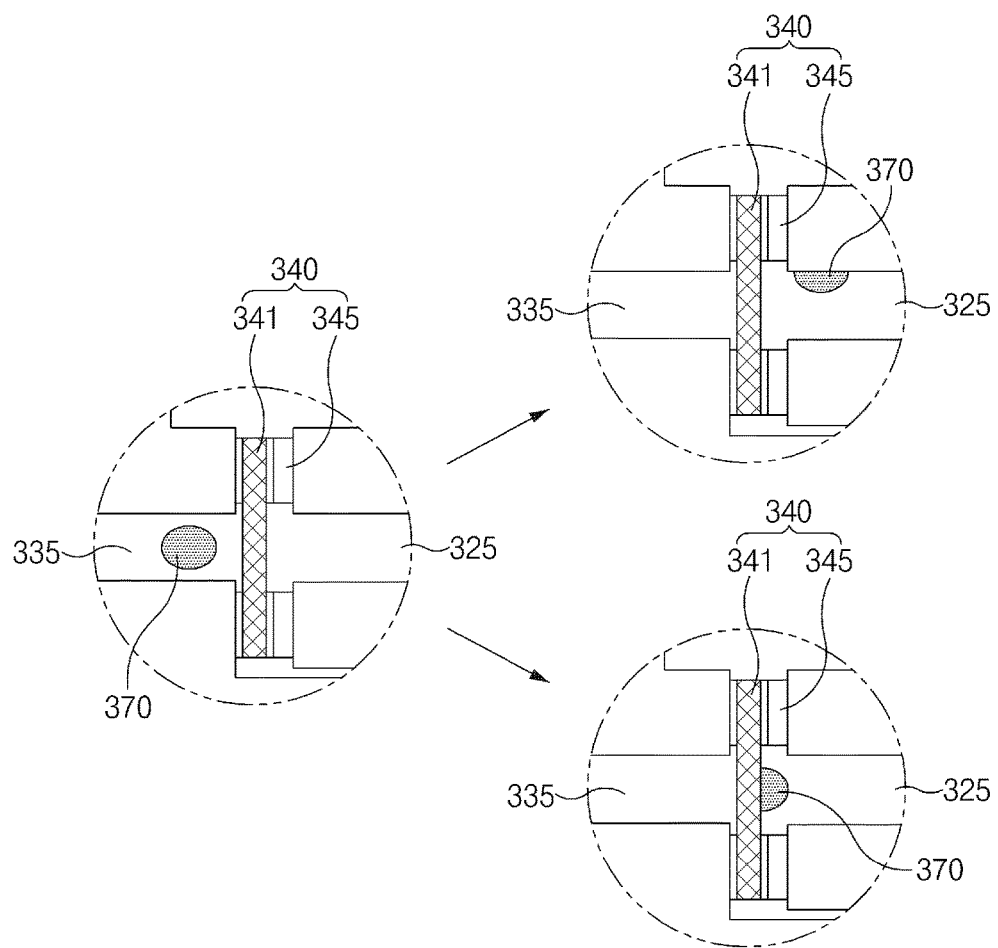

According to various embodiments of the present disclosure, the sound output module 210 may include a heat emitting structure for removing moisture introduced into the sound output module 210 (or for emitting the moisture to the outside). The heat emitting structure may emit the moisture introduced into the sound output module 210 by generating heat according to a specific condition. FIGS. 3A and 3B are sectional views of a sound output module, according to various embodiments of the present disclosure;

Referring to FIG. 3A, the electronic device 101 may include a sound output module 210 in the interior thereof. The sound output module 210 may generate a sound signal and output the sound signal to the outside of electronic device 101. The sound output module 210 may include a heat emitting structure in the interior thereof. Through the heat emitting structure, the residual moisture left in the interior of the sound output module 210 after a submersion of electronic device 101 may be evaporated or removed.

The interior temperature of the sound output module 210 may be increased by the heat emitted from the heat emitting structure and the interior gas may be expanded. Accordingly, the internal pressure may be increased, causing air to flow to the outside where pressure is lower than the internal pressure of the sound output module 210, and the interior moisture may be evaporated or discharged.

According to an embodiment of the present disclosure, the sound output module 210a may include a speaker 310, an enclosure 320 (or an inner housing or a speaker housing), an outer housing 330, a sealing member 340, and a heat emitting structure 350.

The speaker 310 may convert an electrical signal provided from the interior of the electronic device 101 to a sound signal and may output the sound signal. According to an embodiment of the present disclosure, the speaker 310 may support a waterproof function that may be implemented even when moisture is introduced into a periphery of the speaker 310.

The enclosure 320 may surround the speaker 310. The enclosure 320 may separate the speaker 310 and the interior of the electronic device 101. The enclosure 320 may prevent the sound signal output from the speaker 310 from being discharged to another part of the electronic device 101 (e.g., by preventing degradation of sound performance). Further, the enclosure 320 may prevent the moisture or foreign substances introduced into the sound space 305 from penetrating into the electronic device 101. The enclosure 320 may include a pipe passage 325 that guides the sound signal such that the sound signal is emitted to the outside.

The sound space 305 may be formed between the enclosure 320 and the speaker 310. The sound signal generated by the speaker may be delivered through the air in the sound space 305, and may be output to the outside of the electronic device 101 through the pipe passage 325 formed in the enclosure 320.

The outer housing 330 may be fixed to the enclosure 320. The outer housing 330 may include a pipe passage 335 connected to the pipe passage 325 of the enclosure 320.

The sealing member 340 may prevent the moisture from penetrating into the electronic device 101 between the enclosure 320 and the outer housing 330. The sealing member 340 may include a mesh net 341 (or a membrane structure) and a rubber gasket 345. The mesh net 341 and the rubber gasket 345, and the mesh net 341 and the outer housing 330 may be bonded to each other through a waterproof tape or the like.

The mesh net 341 may interrupt moisture or foreign substances from being introduced into the enclosure 320 through the pipe passage 335. The mesh net 341 may be disposed between the pipe passages 325 and 335, through which the sound signal is output. The mesh net 341 may form a specific angle with the pipe passages 325 and 335 or may be attached perpendicularly to the pipe passages 325 and 335.

The mesh net 341 may pass the sound signal to the outside, or may primarily interrupt foreign substances, such as moisture, which are introduced into the mesh net 341. According to various embodiments of the present disclosure, the mesh net 341 may be implemented by a hydrophobic or water-repellent mesh. Through this, the mesh net 341 may make it difficult for the foreign substances, such as exterior moisture, from being introduced into the enclosure 320.

The mesh net 341 cannot completely interrupt the moisture and the moisture may be partially introduced into the interior space of the enclosure 320. Further, when moisture is generated due to dew condensation occurring in the interior of the enclosure 320, the moisture may be interrupted by the mesh net 341 so as not to be emitted to the outside.

The heat emitting structure 350 may emit heat to emit the moisture introduced into the enclosure 320. The heat emitting structure 350 may directly generate heat by using an electrical signal or may deliver heat generated by another heat source. According to various embodiments of the present disclosure, the heat emitting structure 350 may be implemented while a material (e.g., a metallic material) having a high thermal conductivity is coated on an inner surface of the enclosure 320. Although FIG. 3A illustrates that the entire inner surface of the enclosure 320 is coated, the present disclosure is not limited thereto. Only one surface or a part of one surface may be coated or a specific pattern may be coated. The center of the coating area may be in an area that is adjacent to the pipe passage 325.

According to an embodiment of the present disclosure, the sound output module 210b may include a heat emitting structure 360 in the form of a metal wire (e.g., a heating wire) or a plate that is separately formed on an inner surface of the enclosure 320.

According to various embodiments of the present disclosure, the heat emitting structure 360 may be attached to an inner surface of the enclosure 320 through a separate process, or may be inserted into a mold in a process of injection-molding the enclosure 320. In the insert-molding, the heat emitting structure 360 in the form of a metal may be inserted into the mold and fluid plastic for forming the enclosure 320 may be injected into the mold.

When the heat emitting structure 360 is formed through insert-molding, the shape of the heat emitting structure 360 may be deformed by insert-injection pressure, temperature, or the structure of the mold. In this case, the heat emitting structure 360 may be realized with a simplified shape (e.g., an electric wire or a plate) to prevent deformation of the shape of the heat emitting structure 360.

According to various embodiments of the present disclosure, the enclosure 320 may be formed of a material having a relatively high thermal conductivity to facilitate discharge of heat. The enclosure 320 may be formed by adding inorganic filler to a thermoplastic resin. The inorganic filler may include at least one of boron nitride (BN), magnesium oxide (MgO), aluminum oxide ($Al_2O_3$), aluminum nitride (AlN), silicon carbide (SIC), Whisker™, Talc™, and Wallastonite™. Due to the addition of the inorganic filler, the thermal conductivity of the enclosure 320 may increase (e.g., from 0.1 W/m*k to 0.3 W/m*k to 1.0 W/m*k).

FIG. 3B illustrates a process where moisture sticks to different locations of the interior of a sound output module, according to various embodiments of the present disclosure. Although FIG. 3B illustrates that exterior moisture is introduced, the present disclosure is not limited thereto. Moisture may be generated due to dew condensation in the interior of the sound output module 210.

Referring to FIG. 3B, moisture 370 may be introduced through the opening 160. When the user uses the electronic device 101 in water or the electronic device 101 is disposed adjacent to water, the moisture 370 may be introduced.

The moisture 370 introduced through the opening 160 may pass through the mesh net 341. Although it may be difficult to introduce the moisture 370 from outside the electronic device 101 into the enclosure 320 when the mesh net 341 is realized with a hydrophobic and water-repellent mesh, the moisture may be partially introduced into the enclosure 320 when there is a large amount of moisture 370 existing around the electronic device 101.

The mesh net 341 may primarily interrupt the introduction of the moisture 370. When the moisture 370 is introduced into an inner pipe passage 325, the mesh net 341 may make it difficult to emit the moisture 370 again.

The moisture 370 that passed through the mesh net 341 may be stuck to the inner pipe passage 325 or may be stuck to the inner surface of the mesh net 341.

Figure 4A:
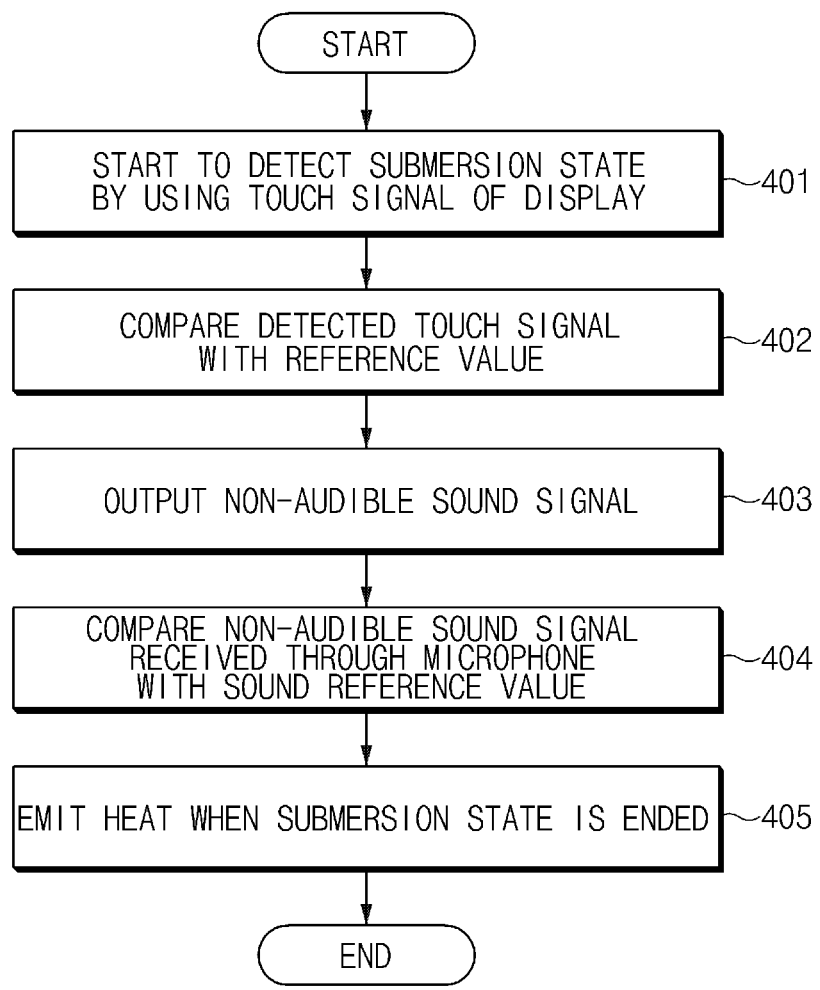
FIGS. 4A and 4B are flowcharts illustrating a process of controlling a heat emitting structure, according to various embodiments of the present disclosure.

The moisture may be stuck to the inner pipe passage 325 through the internal heat emitting structure 350, or the moisture stuck to the inner surface of the mesh net 341 may be eliminated through evaporation. FIG. 4A is a flowchart illustrating a process of detecting introduction of moisture, according to various embodiments of the present disclosure. FIG. 4A is simply an embodiment, and the present disclosure is not limited thereto.

Referring to FIG. 4A, in step 401, a control unit (e.g., a processor) in the interior of the electronic device 101 may start to detect a submersion state of the electronic device 101 by using a touch signal of a display.

When a submersion state of the electronic device 101 is detected by using various sensors (e.g., a pressure sensor or a microphone), power consumption may increase compared to when the sensors are normally driven. Meanwhile, when the control unit detects a submersion state of the electronic device 101 by using a touch signal of the display, the power consumed by the sensors may be reduced. According to various embodiments of the present disclosure, when the display is operated in an always-on-touch (AOT) scheme, the control unit may recognize a touch input of the user to determine whether the electronic device 101 is in a submersion state without consuming additional power.

In step 402, the control unit may compare a detected touch signal with a preset touch signal reference value. The touch signal reference value may be set in advance based on the output characteristics of the touch signal and be stored. According to an embodiment of the present disclosure, the touch signal reference value may include a value regarding an area of the display, in which the touch signal is changed, or touch sensitivity. The control unit may compare the detected touch signal with the touch signal reference value in a non-submersion state.

In step 403, when the control unit determines a submersion state, the speaker 310 may output a non-audible sound signal.

In step 404, the control unit may determine a submersion continuation state by comparing the non-audible sound signal received through a microphone with the sound reference value. The sound reference value may be set in advance based on the reception characteristics of the non-audible sound signals that are shown in the submersion state and the non-submersion state of the electronic device 101 and be stored. Because moisture may be introduced into the electronic device 101 again even if the residual moisture is emitted when the electric device 101 is in a submersion state, the control unit may not generate separate heat through the heat emitting structures 350 and 360.

According to various embodiments of the present disclosure, the control unit may detect an inclination of the electronic device 101 by using a sensor (e.g., a gyro sensor). When it is determined that the inclination of the electronic device 101 is a specific value or less, the control unit may allow the heat emitting structures 350 and 360 to emit heat. When the inclination of the electronic device 101 is the specific value or less, moisture emission efficiency may be increased.

In step 405, when the submersion state has ended, the control unit may generate an electrical signal such that the heat emitting structures 350 and 360 may emit heat.

Figure 4B:
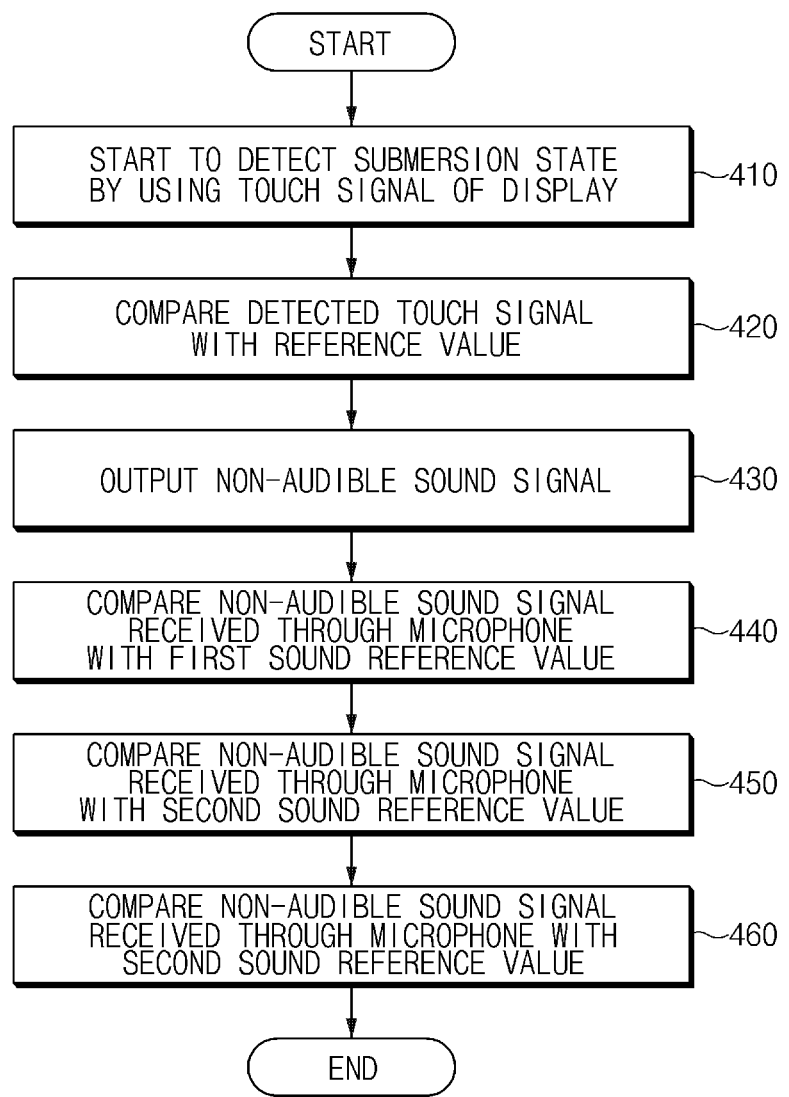

FIG. 4B is a flowchart illustrating a process of detecting residual moisture through a plurality of emissions of sound signals, according to various embodiments of the present disclosure. However, FIG. 4B is an embodiment and the present disclosure is not limited thereto.

Referring to FIG. 4B, heat emission and a degree of heat emission of the heat emitting structures 350 and 360 may be adjusted. If it is determined that moisture is introduced into the enclosure 320, the control unit may apply an electrical signal to the heat emitting structure 360. Accordingly, the heat emitting structure 360 may generate heat. In step 410, the control unit may detect a submersion state of the electronic device 101 by using a touch signal of the display.

In step 420, the control unit may determine whether the electronic device 101 is in a submersion state by comparing the detected touch signal with a preset touch signal reference value. Step 410 may be the same as or similar to steps 401 or 402.

In step 420, the control unit may determine whether the electronic device 101 is in a submersion state by comparing with detected touch signal with a preset touch signal reference value. Steps 410 and 420 may be the same as or similar to steps 401 and 402.

In step 430, when the control unit determines that the electronic device 101 is in a submersion state, the speaker 310 may output a non-audible sound signal.

In step 440, the control unit may determine whether the electronic device 101 is in a submersion state by comparing the non-audible sound signal received through a microphone with a first sound reference value. The first sound reference value may be set in advance based on the reception characteristics of the non-audible sound signals that are shown in the submersion state and the non-submersion state of the electronic device 101 and be stored.

In step 450, the control unit may determine whether there is residual moisture in the interior of the sound output module 210 by comparing the non-audible sound signal received through a microphone with a second sound reference value. The second sound reference value may be set in advance based on the reception characteristics of the non-audible sound signals that appear in a state in which residual moisture is present or not present in the interior of the sound output module 210 and be stored.

In step 460, when it is determined that residual moisture is present in the interior of the sound output module 210, the control unit may generate an electrical signal such that the heat emitting structures 350 and 360 may emit heat.

According to various embodiments of the present disclosure, the control unit may detect an inclination of the electronic device 101 by using a sensor (e.g., a gyro sensor), and may allow the heat emitting structures 350 and 360 to emit heat. When the inclination of the electronic device 101 is the specific value or less, moisture emission efficiency may be increased.

According to various embodiments of the present disclosure, the control unit may perform a process of allowing the heat emitting structures 350 and 360 to emit heat for a specific number of times or for a specific period of time, and may repeat the processes of step 450 or step 460. The control unit may repeat a process of allowing the heat emitting structures 350 and 360 to emit heat until the residual moisture disappears.

Figure 5:
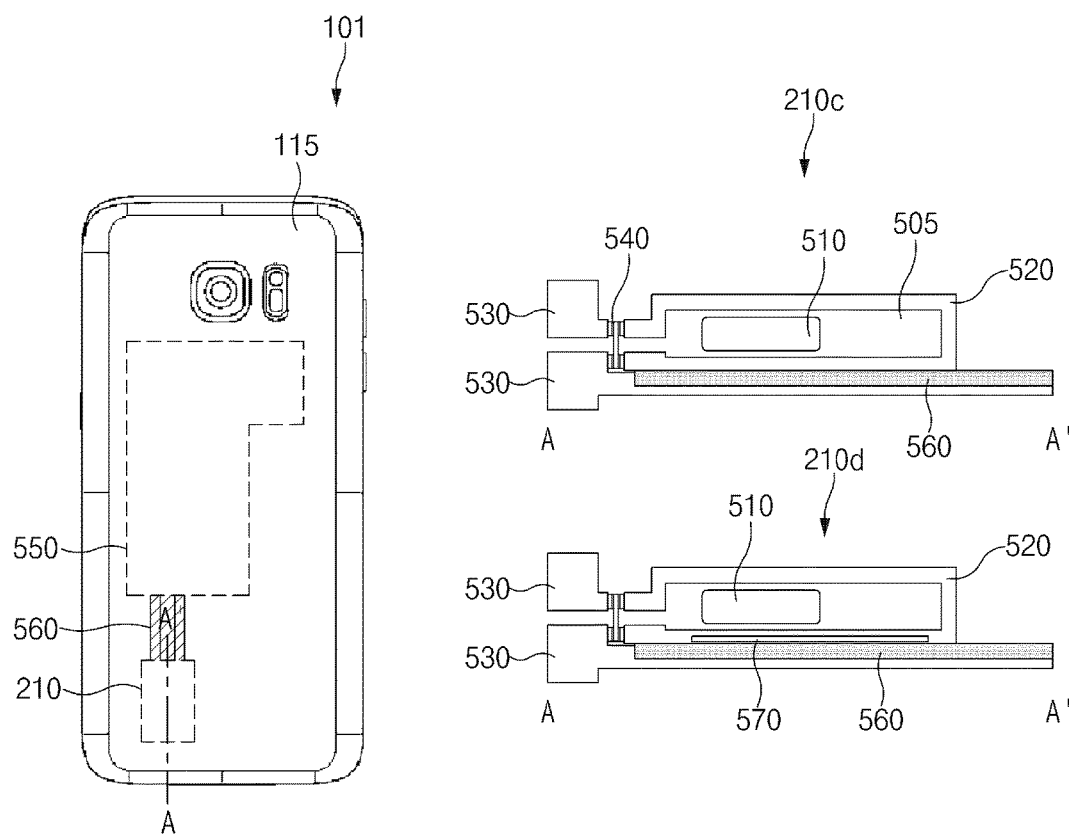
FIG. 5 is a view of a heat emitting structure using heat of a printed circuit board (PCB), according to various embodiments of the present disclosure.

FIG. 5 is a view of a heat emitting structure using heat of a PCB, according to various embodiments of the present disclosure.

Referring to FIG. 5, the sound output module 210 may deliver heat generated in a heat emitting element (e.g., a processor chip, a communication chip, or a display driving chip) attached to a PCB 550.

A heat transfer unit 560 (e.g., a heat pipe) may physically connect the heat emitting element on the PCB 550 and the sound output module 210 to transfer heat. The heat transfer unit 560 may transfer the heat generated by a heat emitting element, a temperature of which is higher, to a sound output module 210, a temperature of which is lower.

According to an embodiment of the present disclosure, the sound output module 210c may include a speaker 510, an enclosure 520 (or an inner housing or a speaker housing), an outer housing 530, and a sealing member 540. At least a portion of the heat transfer unit 560 may be attached to an outer surface of the enclosure 520 of the sound output module 210c. The heat transferred through the heat transfer unit 560 may be transferred to an internal sound space 505 of the enclosure 520 through an inner wall of the enclosure 520.

When moisture is introduced into the internal sound space 505, the moisture may be emitted by the heat transferred through the heat transfer unit 560 and the enclosure 520.

According to various embodiments of the present disclosure, the enclosure 520 may be formed of a material having a relatively high thermal conductivity to facilitate discharge of heat. The enclosure 520 may be formed by adding inorganic filler to a thermoplastic resin. The inorganic filler may include at least one of boron nitride (BN), magnesium oxide (MgO), aluminum oxide ($Al_2O_3$), aluminum nitride (AlN), silicon carbide (SIC), Whisker™, Talc™, and Wallastonite™. Due to the addition of the inorganic filler, the thermal conductivity of the enclosure 520 may increase (e.g., from 0.1 W/m*k to 0.3 W/m*k to 1.0 W/m*k).

According to various embodiments of the present disclosure, as illustrated in FIG. 3, the enclosure 520 may include a heat emitting structure in the interior thereof. The heat emitting structure may be in a form in which a material (e.g., a metallic material) having a high thermal conductivity is coated on an inner surface of the enclosure 520.

According to an embodiment of the present disclosure, the sound output module 210d may further include a heat transfer member 570 for increasing heat transfer efficiency. The heat transfer member 570 may be disposed between the enclosure 520 and the heat transfer unit 560 to increase heat transfer efficiency. The heat transfer member 570 may be formed of a material of a thermal conductivity that is higher than that of the enclosure 520. For example, the heat transfer member 570 may be a thermal interface material (TIM) tape, stainless steel (SUS), etc.

Figure 6:
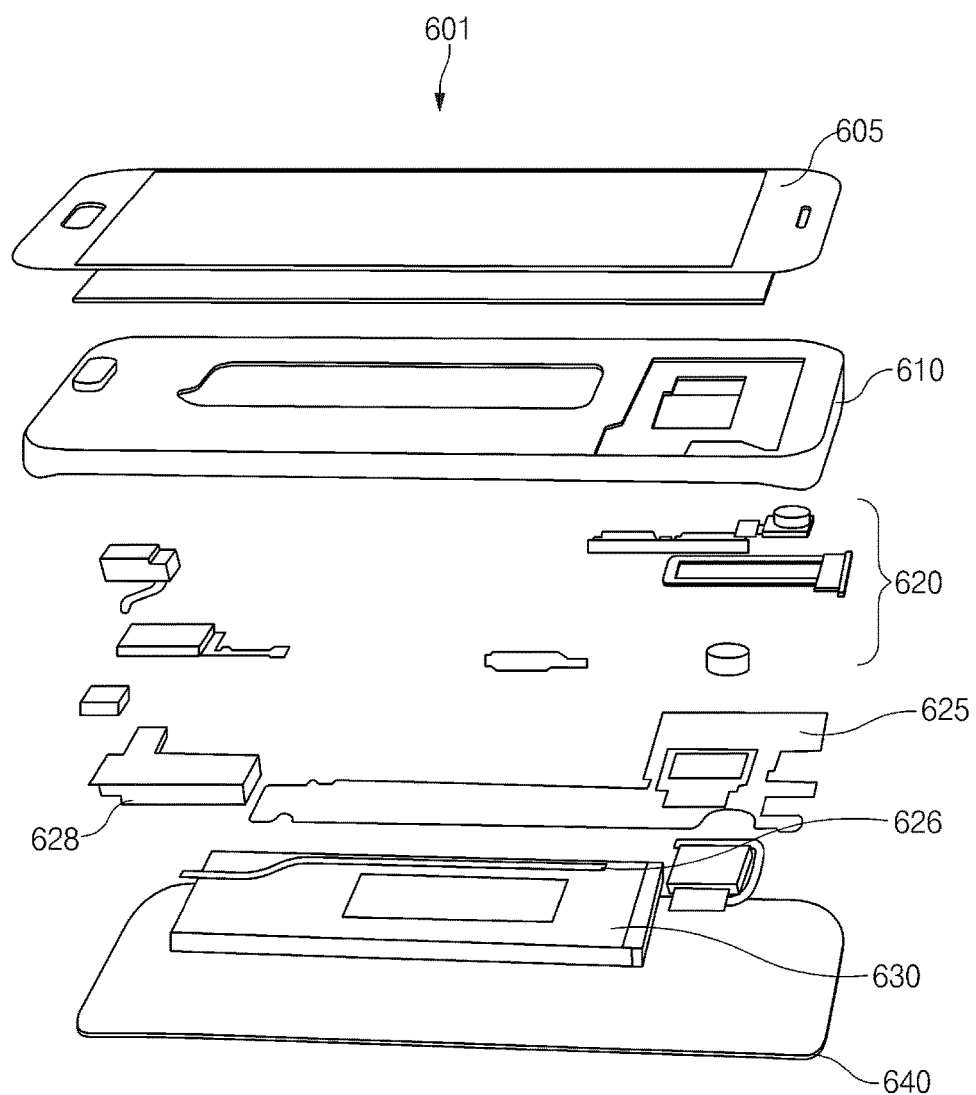
FIG. 6 is an exploded perspective view of an inside of an electronic device, according to various embodiments of the present disclosure.

FIG. 6 is an exploded perspective view of an inside of an electronic device, according to various embodiments of the present disclosure.

Referring to FIG. 6, the electronic device 601 may include a display module 605, an inner housing 610, an internal configuration 620, a printed circuit board 625, a heat transfer unit 626, a sound output module 628, a battery 630, and a rear cover 640.

The display module 605 may include a window panel, a display panel, or a touch panel. The display module 605, the internal configuration 620, the printed circuit board 625, etc. may be seated in the inner housing 610. The inner configuration 620 may include various configurations, such as a card tray, a vibrational element, and a charging terminal.

Various integrated circuit (IC) chips or modules may be mounted on the printed circuit board 625. Various elements, such as a processor and a communication chip, may be mounted on the printed circuit board 625. The elements may generate heat according to operation characteristics of the elements.

The heat transfer unit 626 may transfer the heat generated by the element mounted to the printed circuit board 625 to the sound output module 628. The heat transfer unit 626 may be realized through a metallic material (e.g., copper) having a high thermal conductivity.

The form of the heat transfer unit 626 may take on various shapes. The heat transfer unit 626 may be implemented to be deflected or branched so as to contact the elements that emit the most heat. The heat transfer unit 626 may be connected to an element with a temperature that is suitable for removing the moisture introduced into the sound output module 628.

The sound output module 628 may emit the heat introduced into the sound output module 628 by using the heat provided from the heat transfer unit 626. The interior temperature of the sound output module 628 may be increased by the introduced heat and the interior gas may be expanded. Accordingly, as the internal pressure may be increased, air flows to the outside because pressure is lower than the internal pressure of the sound output module 628, and the interior moisture may be evaporated or discharged.

Figure 7:
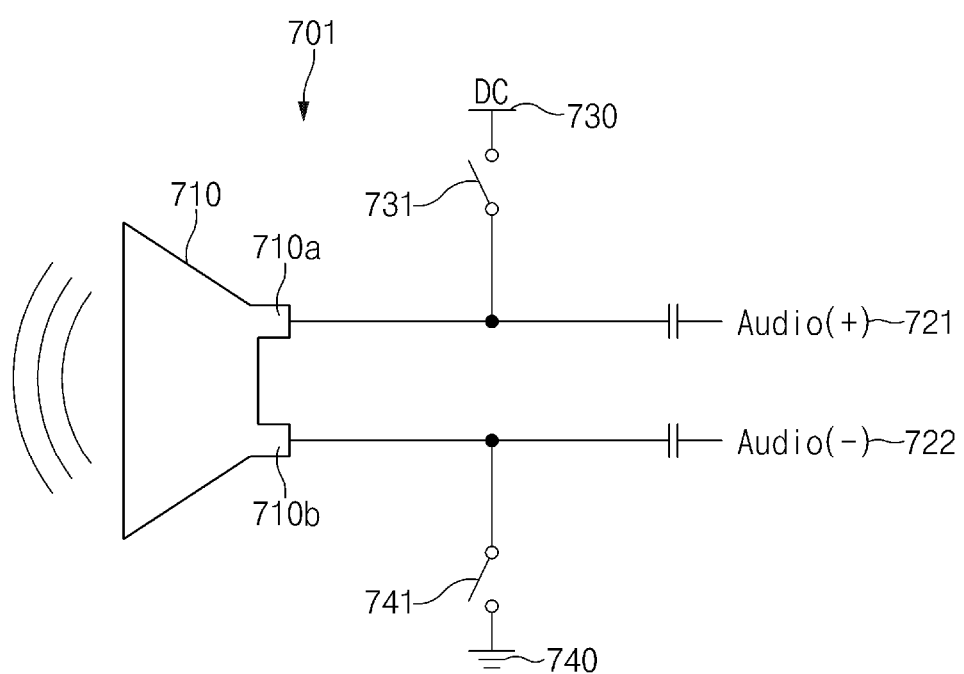
FIG. 7 illustrates the output of a non-audible signal, according to various embodiments of the present disclosure.

FIG. 7 illustrates the output of a non-audible signal, according to various embodiments of the present disclosure.

Referring to FIG. 7, a speaker device 701 may change an electrical audio signal into a sound signal (e.g., a sound) and output the changed sound signal. The speaker device 701 may include an output unit 710 and audio terminals 721 and 722. According to various embodiments of the present disclosure, the speaker device 701 may further include a DC power source 730 for generating heat in an output unit 710, a first switch 731, a ground unit 740, and a second switch 741.

The output unit 710 may generate a sound signal by using an electrical signal. The output unit 710 may be formed as a coil wound around a magnet, and an electrical signal transmitted from an internal circuit of electronic device may be changed to a sound signal and be output. The output unit 710 may have a resistor, and heat may be generated by a current flowing through the resistor.

The output unit 710 may output a sound signal according to an audio signal received from an audio (+) terminal 721 and an audio (−) terminal 722 of the electronic device.

The DC power source 730 and a first switch 731 may be connected between a first input terminal 710a of the output unit 710 and an AC power source. A ground unit 740 and a second switch 741 may be connected between a second input terminal 710b of the output unit 710 and the AC power source. The first switch 731 and the second switch 741 may be controlled through a separate control unit.

In a general state in which moisture is not introduced to a periphery of the output unit 710, the first switch 731 and the second switch 741 may be in an open state. The output unit 710 may output (e.g., playback of music, playback of a video, and output of a sound of an app) a sound according to a signal provided by the audio (+) terminal 721 and an audio (−) signal 722.

When it is determined that moisture is introduced into an interior space of the enclosure around the output unit 710, the control unit may change the states of the first switch 731 and the second switch 741 to both be in the closed states. In this case, the DC power source 730 may be connected to the first input terminal 710a of the output unit 710, and the ground unit 740 may be connected to the second input terminal 710b of the output unit 710. Heat may be generated by a DC current that passes through the output unit 710 from the DC power source 730 and flows to the ground unit 740. The moisture around the output unit 710 may be evaporated or emitted by the generated heat.

According to various embodiments of the present disclosure, the control unit may change the states of the first switch 731 and the second switch 741 from the closed states to the open states when an audio signal is generated through the audio (+) terminal 721 and the audio (−) terminal 722 (e.g., a sound is generated during execution of an app, playback of music is started, or playback of a video is started). Through this, interference noise may be reduced.

According to various embodiments of the present disclosure, a non-audible audio signal may be output through the audio (+) terminal 721 and the audio (−) terminal 722 in a state in which the first switch 731 and the second switch 741 are closed. The non-audible audio signal may be an audio signal that deviates from a frequency region (e.g., 20 Hz to 20 kHz) in which the user may hear the audio signal. The control unit may vibrate a vibration plate in the interior of the output unit 710 by using the non-audible audio signal, and accordingly, may increase the heat transfer efficiency.

Figure 8:
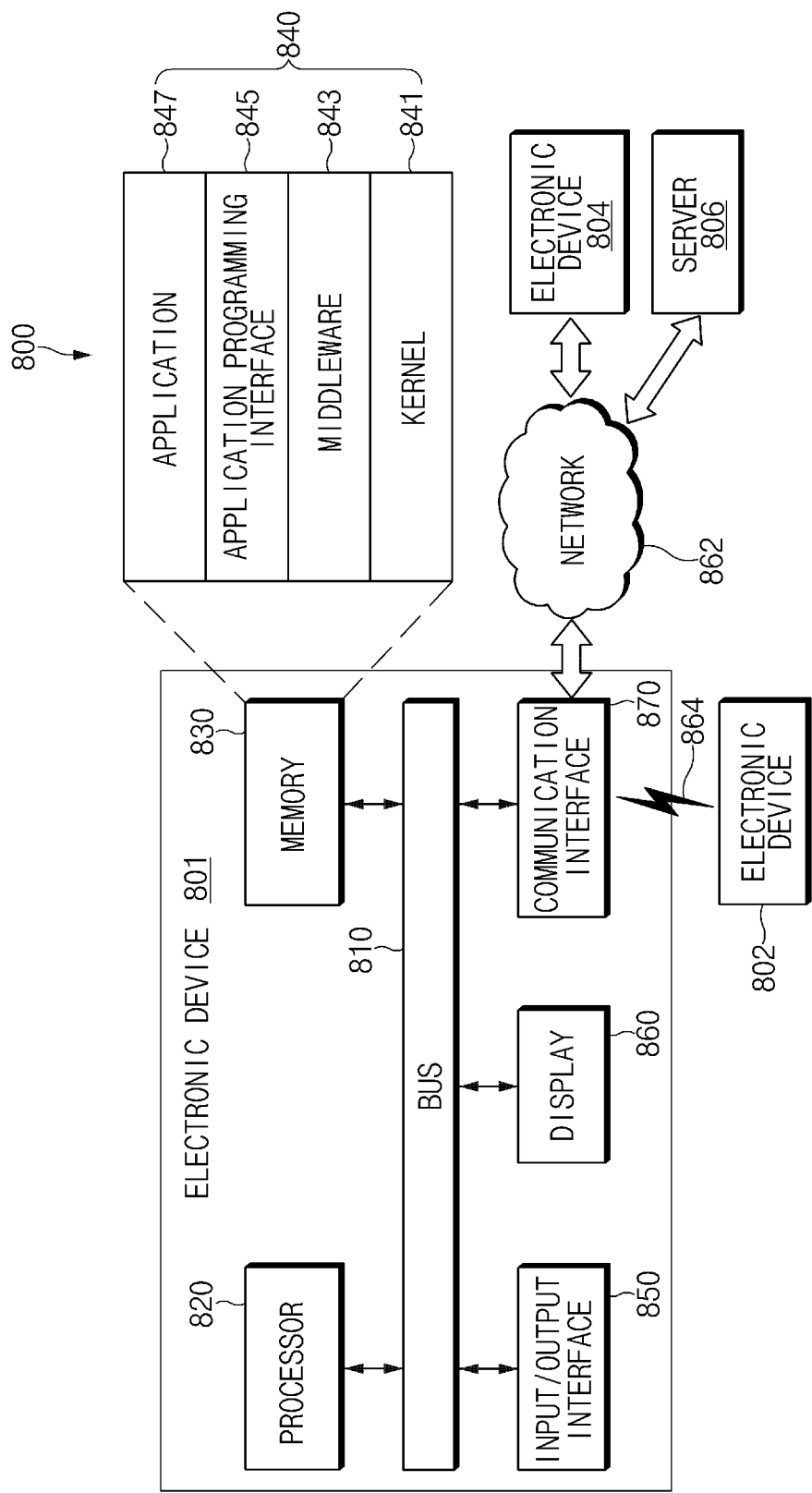
FIG. 8 illustrates an electronic device in a network environment, according to various embodiments of the present disclosure.

FIG. 8 illustrates an electronic device in a network environment, according to an embodiment of the present disclosure.

Referring to FIG. 8, an electronic device 801 in a network environment 800 may include a bus 810, a processor 820, a memory 830, an input/output interface 850, a display 860, and a communication interface 870. According to various embodiments of the present disclosure, at least one of the foregoing elements may be omitted or other elements may be added to the electronic device 801.

The bus 810 may include a circuit for connecting the above-mentioned elements 820 to 870 to each other and transferring communications (e.g., control messages and/or data) among the above-mentioned elements.

The processor 820 may include at least one of a CPU, an AP, or a communication processor (CP). The processor 820 may perform data processing or an operation related to communication and/or control of at least one of the other elements of the electronic device 801.

The memory 830 may include a volatile memory and/or a nonvolatile memory. The memory 830 may store instructions or data related to at least one of the other elements of the electronic device 801. According to an embodiment of the present disclosure, the memory 830 may store software and/or a program 840. The program 840 may include, for example, a kernel 841, a middleware 843, an application programming interface (API) 845, and/or applications 847. At least a portion of the kernel 841, the middleware 843, or the API 845 may be referred to as an operating system (OS).

The kernel 841 may control or manage system resources (e.g., the bus 810, the processor 820, the memory 830, etc.) used to perform operations or functions of other programs (e.g., the middleware 843, the API 845, or the applications 847). Furthermore, the kernel 841 may provide an interface for allowing the middleware 843, the API 845, or the applications 847 to access individual elements of the electronic device 801 in order to control or manage the system resources.

The middleware 843 may serve as an intermediary so that the API 845 or the applications 847 communicates and exchanges data with the kernel 841.

Furthermore, the middleware 843 may handle one or more task requests received from the application 847 according to a priority order. For example, the middleware 843 may assign at least one applications 847 a priority for using the system resources (e.g., the bus 810, the processor 820, the memory 830, etc.) of the electronic device 801. For example, the middleware 843 may handle the one or more task requests according to the priority assigned to the at least one application, thereby performing scheduling or load balancing with respect to the one or more task requests.

The API 845, which is an interface for allowing the applications 847 to control a function provided by the kernel 841 or the middleware 843, may include, for example, at least one interface or function (e.g., instructions) for file control, window control, image processing, character control, etc.

The input/output interface 850 may serve to transfer an instruction or data input from a user or another external device to (an)other element(s) of the electronic device 801. Furthermore, the input/output interface 850 may output instructions or data received from (an)other element(s) of the electronic device 801 to the user or another external device.

The display 860 may include, for example, a liquid crystal display (LCD), a light-emitting diode (LED) display, an organic light-emitting diode (OLED) display, a microelectromechanical systems (MEMS) display, or an electronic paper display. The display 860 may present various content (e.g., a text, an image, a video, an icon, a symbol, etc.) to the user. The display 860 may include a touch screen, and may receive a touch, a gesture, proximity or hovering input from an electronic pen or a part of a body of the user.

The communication interface 870 may set communications between the electronic device 801 and an external device (e.g., a first external electronic device 802, a second external electronic device 804, or a server 806). The communication interface 870 may be connected to a network 862 via wireless communications or wired communications so as to communicate with the external device.

The wireless communications may employ at least one of cellular communication protocols such as long-term evolution (LTE), LTE-advance (LTE-A), code division multiple access (CDMA), wideband CDMA (WCDMA), universal mobile telecommunications system (UMTS), wireless broadband (WiBro), or global system for mobile communications (GSM). The wireless communications may include, for example, a short-range communications 864. The short-range communications may include at least one of wireless fidelity (Wi-Fi), Bluetooth™, near field communication (NFC), magnetic stripe transmission (MST), or GNSS.

The MST may generate pulses according to transmission data and the pulses may generate electromagnetic signals. The electronic device 801 may transmit the electromagnetic signals to a reader device such as a POS device. The POS device may detect the magnetic signals by using a MST reader and restore data by converting the detected electromagnetic signals into electrical signals.

The GNSS may include, at least one of global positioning system (GPS), global navigation satellite system (GLONASS), BeiDou navigation satellite system (BeiDou), or Galileo, the European global satellite-based navigation system according to a use area or a bandwidth. Hereinafter, the term "GPS" and the term "GNSS" may be interchangeably used. The wired communications may include at least one of USB, high definition multimedia interface (HDMI), recommended standard 832 (RS-232), plain old telephone service (POTS), etc. The network 862 may include at least one of telecommunications networks, for example, a computer network (e.g., local area network (LAN) or wide area network (WAN)), the Internet, or a telephone network.

The types of the first external electronic device 802 and the second external electronic device 804 may be the same as or different from the type of the electronic device 801. According to an embodiment of the present disclosure, the server 806 may include a group of one or more servers. A portion or all of operations performed in the electronic device 801 may be performed in one or more other electronic devices (e.g., the first electronic device 802, the second external electronic device 804, or the server 806). When the electronic device 801 should perform a certain function or service automatically or in response to a request, the electronic device 801 may request at least a portion of functions related to the function or service from another device instead of or in addition to performing the function or service for itself. The other electronic device may perform the requested function or additional function, and may transfer a result of the performance to the electronic device 801. The electronic device 801 may use a received result itself or additionally process the received result to provide the requested function or service. To this end a cloud computing technology, a distributed computing technology, or a client-server computing technology may be used.

Figure 9:
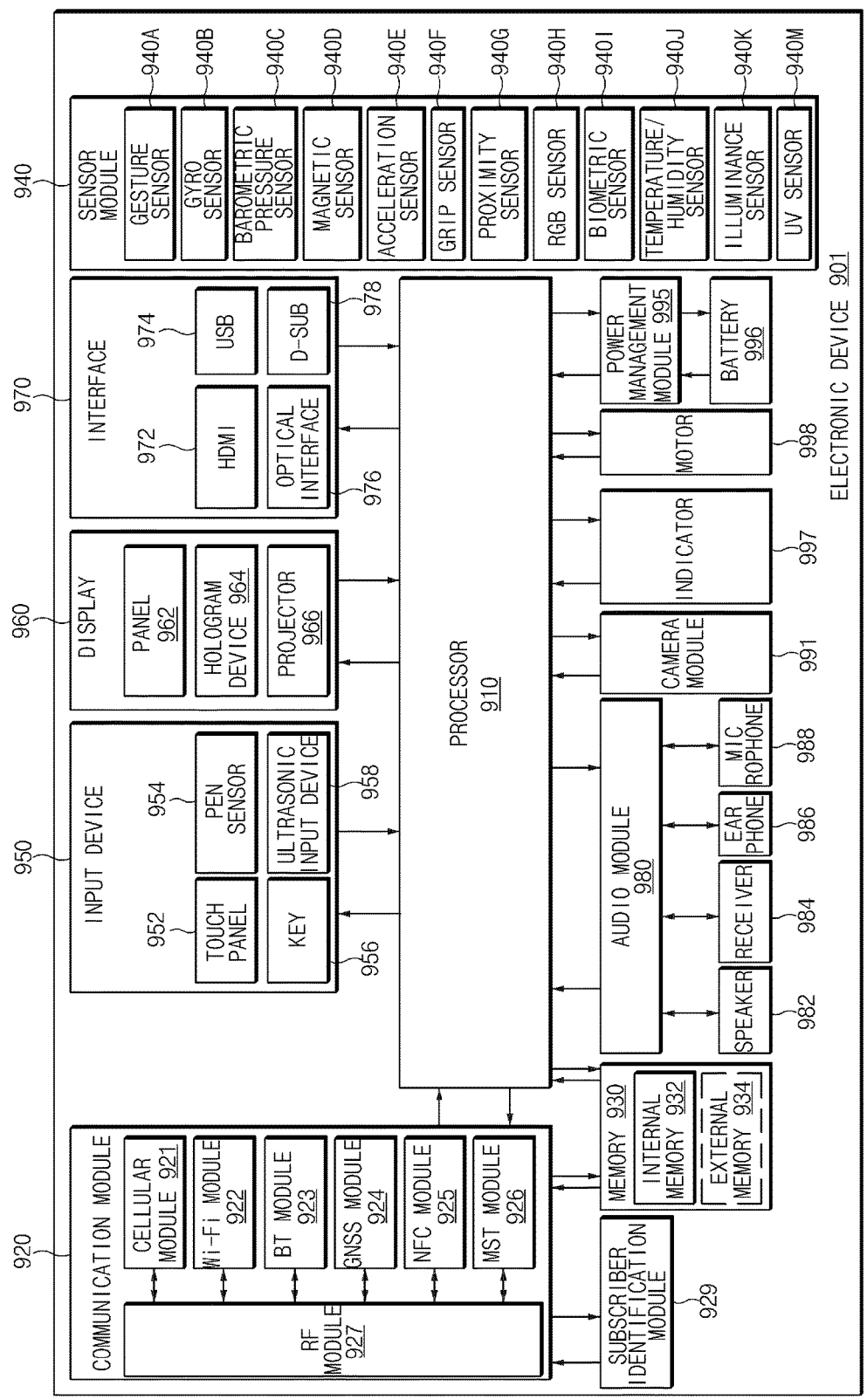
FIG. 9 is a block diagram of an electronic device, according to various embodiments of the present disclosure.

FIG. 9 is a block diagram illustrating an electronic device, according to an embodiment of the present disclosure.

Referring to FIG. 9, an electronic device 901 may include a part or the entirety of the electronic device 801. The electronic device 901 may include at least one processor 910 (e.g., an AP), a communication module 920, a subscriber identification module (SIM) 929, a memory 930, a sensor module 940, an input device 950, a display 960, an interface 970, an audio module 980, a camera module 991, a power management module 995, a battery 996, an indicator 997, and a motor 998.

The processor 910 may run an OS or an application program so as to control a plurality of hardware or software elements connected to the processor 910, and may process various data and perform operations. The processor 910 may be implemented as a system on chip (SoC). According to an embodiment of the present disclosure, the processor 910 may further include a graphic processing unit (GPU) and/or an image signal processor (ISP). The processor 910 may include at least a portion (e.g., a cellular module 921) of the elements of electronic device 901. The processor 910 may load, on a volatile memory, an instruction or data received from other elements (e.g., a nonvolatile memory) to process the instruction or data, and may store various data in a nonvolatile memory.

The communication module 920 may have a configuration that is the same as or similar to that of the communication interface 870. The communication module 920 may include a cellular module 921, a Wi-Fi module 922, a Bluetooth (BT) module 923, a GNSS module 924 (e.g., a GPS module, a GLONASS module, a BeiDou module, or a Galileo module), an NFC module 925, an MST module 926, and a radio frequency (RF) module 927.

The cellular module 921 may provide a voice call service, a video call service, a text message service, or an Internet service through a communication network. The cellular module 921 may identify and authenticate the electronic device 901 in the communication network using the SIM 929 (e.g., a SIM card). The cellular module 921 may perform at least a part of functions that may be provided by the processor 910. The cellular module 921 may include a CP.

Each of the Wi-Fi module 922, the BT module 923, the GNSS module 924, and the NFC module 925 may include a processor for processing data transmitted/received through the modules. According to various embodiments of the present disclosure, at least a part (e.g., two or more) of the cellular module 921, the Wi-Fi module 922, the BT module 923, the GNSS module 924, and the NFC module 925 may be included in a single IC or IC package.

The RF module 927 may transmit/receive communication signals (e.g., RF signals). The RF module 927 may include a transceiver, a power amp module (PAM), a frequency filter, a low noise amplifier (LNA), an antenna, etc. According to an embodiment of the present disclosure, at least one of the cellular module 921, the Wi-Fi module 922, the BT module 923, the GNSS module 924, or the NFC module 925 may transmit/receive RF signals through a separate RF module.

The SIM 929 may include an embedded SIM and/or a card containing the SIM, and may include unique identification information (e.g., an integrated circuit card identifier (ICCID)) or subscriber information (e.g., international mobile subscriber identity (IMSI)).

The memory 930 may include an internal memory 932 or an external memory 934. The internal memory 932 may include a volatile memory (e.g., a dynamic RAM (DRAM), a static RAM (SRAM), a synchronous dynamic RAM (SDRAM), etc.), a nonvolatile memory (e.g., a one-time programmable ROM (OTPROM), a programmable ROM (PROM), an erasable and programmable ROM (EPROM), an electrically erasable and programmable ROM (EEPROM), a mask ROM, a flash ROM, a flash memory (e.g., a NAND flash memory, a NOR flash memory, etc.)), a hard drive, or a solid state drive (SSD).

The external memory 934 may include a flash drive such as a compact flash (CF), a secure digital (SD), a Micro-SD, a Mini-SD, an extreme digital (xD), a MultiMediaCard (MMC), a memory stick, etc. The external memory 934 may be operatively and/or physically connected to the electronic device 901 through various interfaces.

The sensor module 940 may measure physical quantity or detect an operation state of the electronic device 901 so as to convert measured or detected information into an electrical signal. The sensor module 940 may include a gesture sensor 940A, a gyro sensor 940B, a barometric pressure sensor 940C, a magnetic sensor 940D, an acceleration sensor 940E, a grip sensor 940F, a proximity sensor 940G, a color sensor 940H (e.g., a red, green, blue (RGB) sensor), a biometric sensor 940I, a temperature/humidity sensor 940J, an illumination sensor 940K, or an ultraviolet (UV) sensor 940M. Additionally or alternatively, the sensor module 940 may include an olfactory sensor (E-nose sensor), an electromyography (EMG) sensor, an electroencephalogram (EEG) sensor, an electrocardiogram (ECG) sensor, an infrared (IR) sensor, an iris recognition sensor, and/or a fingerprint sensor. The sensor module 940 may further include a control circuit for controlling at least one sensor included therein. According to various embodiments of the present disclosure, the electronic device 901 may further include a processor configured to control the sensor module 940 as a part of the processor 910 or separately, so that the sensor module 940 is controlled while the processor 910 is in a sleep state.

The input device 950 may include a touch panel 952, a (digital) pen sensor 954, a key 956, or an ultrasonic input device 958. The touch panel 952 may employ a capacitive, a resistive, an infrared, and an ultraviolet sensing methods. The touch panel 952 may further include a control circuit. The touch panel 952 may further include a tactile layer so as to provide a haptic feedback to a user.

The (digital) pen sensor 954 may include a sheet for recognition which is a part of a touch panel or is separate. The key 956 may include a physical button, an optical button, or a keypad. The ultrasonic input device 958 may sense ultrasonic waves generated by an input tool through a microphone 988 so as to identify data corresponding to the ultrasonic waves sensed.

The display 960 may include a panel 962, a hologram device 964, or a projector 966. The panel 962 may have a configuration that is the same as or similar to that of the display 860. The panel 962 may be flexible, transparent, or wearable. The panel 962 and the touch panel 952 may be integrated into a single module. The hologram device 964 may display a stereoscopic image in a space using a light interference phenomenon. The projector 966 may project light onto a screen so as to display an image. The screen may be disposed in the inside or the outside of the electronic device 901. According to an embodiment of the present disclosure, the display 960 may further include a control circuit for controlling the panel 962, the hologram device 964, or the projector 966.

The interface 970 may include an HDMI 972, a USB 974, an optical interface 976, or a D-subminiature (D-sub) 978. The interface 970 may be included in the communication interface 870. Additionally or alternatively, the interface 970 may include a mobile high-definition link (MHL) interface, an SD card/MMC interface, or an Infrared Data Association (IrDA) interface.

The audio module 980 may convert a sound into an electrical signal or vice versa. At least a portion of elements of the audio module 980 may be included in the input/output interface 850. The audio module 980 may process sound information input or output through a speaker 982, a receiver 984, an earphone 986, or the microphone 988.

The camera module 991 may shoot a still image or a video. According to an embodiment of the present disclosure, the camera module 991 may include at least one image sensor (e.g., a front sensor or a rear sensor), a lens, an ISP, or a flash (e.g., an LED or a xenon lamp).

The power management module 995 may manage power of the electronic device 901. According to an embodiment of the present disclosure, the power management module 995 may include a power management integrated circuit (PMIC), a charger IC, or a battery gauge. The PMIC may employ a wired and/or wireless charging method. The wireless charging method may include a magnetic resonance method, a magnetic induction method, an electromagnetic method, etc. An additional circuit for wireless charging, such as a coil loop, a resonant circuit, a rectifier, etc., may be further included. The battery gauge may measure a remaining capacity of the battery 996 and a voltage, current or temperature thereof while the battery is charged. The battery 996 may include a rechargeable battery and/or a solar battery.

The indicator 997 may display a specific state of the electronic device 901 or a part thereof (e.g., the processor 910), such as a booting state, a message state, a charging state, etc. The motor 998 may convert an electrical signal into a mechanical vibration, and may generate a vibration or haptic effect. A processing device (e.g., a GPU) for supporting a mobile TV may be included in the electronic device 901. The processing device for supporting a mobile TV may process media data according to the standards of digital multimedia broadcasting (DMB), digital video broadcasting (DVB), MediaFLO™, etc.

Each of the elements described herein may be configured with one or more components, and the names of the elements may be changed according to the type of an electronic device. According to various embodiments of the present disclosure, an electronic device may include at least one of the elements described herein, and some elements may be omitted or other additional elements may be added. Furthermore, some of the elements of the electronic device may be combined with each other so as to form one entity, so that the functions of the elements may be performed in the same manner as before the combination.

The term "module" used herein may represent a unit including one of hardware, software, and firmware or a combination thereof. The term "module" may be interchangeably used with the terms "unit", "logic", "logical block", "component" and "circuit". The "module" may be a minimum unit of an integrated component or may be a part thereof. The "module" may be a minimum unit for performing one or more functions or a part thereof. The "module" may be implemented mechanically or electronically. The "module" may include an application specific integrated circuit (ASIC) chip, a field programmable gate array (FPGA), and a programmable-logic device for performing some operations, which are known or will be developed.

At least a part of devices (e.g., modules or functions thereof) or methods (e.g., operations) according to various embodiments of the present disclosure may be implemented as instructions stored in a computer-readable storage medium in the form of a program module. In the case where the instructions are performed by a processor (e.g., the processor 820), the processor may perform functions corresponding to the instructions. The computer-readable storage medium may be, for example, the memory 830.

A computer-readable recording medium may include a hard disk, a floppy disk, a magnetic medium (e.g., a magnetic tape), an optical medium (e.g., CD-ROM, DVD), a magneto-optical medium (e.g., a floptical disk), or a hardware device (e.g., a ROM, a RAM, a flash memory, etc.). The program instructions may include machine language code generated by compilers and high-level language codes that can be executed by computers using interpreters. The above-mentioned hardware device may be configured to be operated as one or more software modules for performing operations of various embodiments of the present disclosure and vice versa.

According to various embodiments of the present disclosure, an electronic device includes an opening formed in a housing of the electronic device, a speaker configured to output a sound signal, an enclosure surrounding the speaker and including a pipe passage, through which the sound signal moves in a direction facing the opening, a heat emitting structure mounted on an inner surface or an outer surface of the enclosure, a sealing member attached to the pipe passage, and a processor physically or electrically connected to the heat emitting structure and configured to control emission of heat.

According to various embodiments of the present disclosure, the heat emitting structure is realized by coating metal on an inner surface of the enclosure.

According to various embodiments of the present disclosure, the heat emitting structure is realized by a heating wire attached to an inner surface of the enclosure.

According to various embodiments of the present disclosure, the heat emitting structure is realized through insert-molding in a process of insert-molding the enclosure. The heat emitting structure has a form of an electric wire or a plate.

According to various embodiments of the present disclosure, the electronic device further includes a display configured to detect a touch input. The processor is configured to determine whether the electronic device is submerged based on a change of a signal corresponding to the touch input. The electronic device further includes a microphone. The microphone collects a non-audible sound signal output through the speaker. The processor is configured to determine a submersion state of the electronic device or a moisture residual state of the sound output module based on the collected non-audible sound signal.

According to various embodiments of the present disclosure, the processor is configured to output the non-audible sound signal through the speaker, and compare a first sound reference value stored in association with operation characteristics of the submersion state of the electronic device and a signal collected through the microphone. The processor is configured to compare a second sound reference value stored in association with operation characteristics of a moisture introduction state of the enclosure and a signal collected through the microphone. The processor is configured to generate heat through the heat emitting structure when it is determined that moisture is introduced into the interior of the enclosure.

According to various embodiments of the present disclosure, the electronic device further includes a sensor configured to collect state information of the electronic device, and the processor is configured to generate heat through the heat emitting structure based on the state information. The sensor includes a gyro sensor, and the processor is configured to generate heat through the heat emitting structure when it is determined that an inclination of the electronic device is a specific value or less.

According to various embodiments of the present disclosure, the enclosure is realized by a material including at least inorganic filler. The inorganic filler includes at least one of boron nitride (BN), magnesium oxide (MgO), aluminum oxide ($Al_2O_3$), aluminum nitride (AlN), silicon carbide (SIC), Whisker™, Talc™, and Wallastonite™.

According to various embodiments of the present disclosure, an electronic device includes a speaker configured to output a sound signal, an enclosure surrounding the speaker, a printed circuit board, on which one or more chips are mounted, and a heat transfer unit connecting the printed circuit board and an outer surface of the enclosure.

According to various embodiments of the present disclosure, the electronic device further includes a heat transfer member disposed between the enclosure and the heat transfer unit. The heat transfer member is realized by a thermal interface material (TIM) tape or stainless steel (SUS).

According to various embodiments of the present disclosure, an electronic device includes a speaker configured to output a sound signal, an enclosure surrounding the speaker, and a processor configured to control the speaker, wherein the processor is configured to increase the temperature of the speaker by outputting a preset non-audible signal through the speaker when it is determined that moisture is introduced into the enclosure.

According to various embodiments of the present disclosure, the electronic device further includes a first switch selectively connecting a first input terminal of the speaker to a DC power source unit, and a second switch selectively connecting a second input terminal of the speaker to a ground unit.

According to various embodiments of the present disclosure, the processor is configured to output the non-audible sound signal by controlling the first switch and the second switch.

A module or a program module according to various embodiments of the present disclosure may include at least one of the above-mentioned elements, or some elements may be omitted or other additional elements may be added. Operations performed by the module, the program module or other elements according to various embodiments of the present disclosure may be performed in a sequential, parallel, iterative, or heuristic way. Furthermore, some operations may be performed in another order or may be omitted, or other operations may be added.

According to various embodiments of the present disclosure, the electronic device may include a heat emitting structure on an inner surface or an outer surface of the enclosure to remove moisture in the interior of the sound output module.

According to various embodiments, the electronic device may control the heat emitting structure by detecting a submersion state or a residual moisture state.

According to various embodiments, the electronic device may output a sound signal of a non-audible band through the speaker and may increase the temperature of the speaker through the sound signal. Through this, interior moisture may be promptly emitted, and a sound output state of high quality may be maintained.

While the present disclosure has been shown and described with reference to certain embodiments thereof, it will be understood by those skilled in the art that various changes in form and details may be made therein without departing from the scope of the present disclosure. Therefore, the scope of the present disclosure should not be defined as being limited to the embodiments, but should be defined by the appended claims and equivalents thereof.

What is claimed is:

1. An electronic device comprising:
    a housing including an opening for outputting a sound signal;
    a display configured to detect a touch input;
    a speaker configured to output the sound signal;
    an enclosure surrounding at least a part of the speaker and including a pipe passage, through which the sound signal moves;
    a heat emitting structure; and
    a processor physically or electrically connected to the heat emitting structure and configured to determine whether the electronic device is submerged based on a change of a signal corresponding to the touch input and control emission of heat.

2. The electronic device of claim 1, wherein the heat emitting structure is formed by coating metal on an inner surface of the enclosure.

3. The electronic device of claim 1, wherein the heat emitting structure comprises by a heating wire attached to an inner surface of the enclosure.

4. The electronic device of claim 3, wherein the heat emitting structure is formed through insert-molding in a process of insert-molding the enclosure.

5. The electronic device of claim 4, wherein the heat emitting structure comprises an electric wire or a plate.

6. The electronic device of claim 1,
    wherein the heat emitting structure is physically connected to the enclosure.

7. The electronic device of claim 1, further comprising:
    a microphone,
    wherein the microphone collects a non-audible sound signal output through the speaker, and
    wherein the processor is further configured to determine a submersion state of the electronic device or a moisture residual state of the speaker based on the collected non-audible sound signal.

8. The electronic device of claim 7, wherein the processor is further configured to:
    output the non-audible sound signal through the speaker; and
    compare a first sound reference value stored in association with operation characteristics of the submersion state of the electronic device and a signal collected through the microphone.

9. The electronic device of claim 8, wherein the processor is further configured to compare a second sound reference value stored in association with operation characteristics of a moisture introduction state of the enclosure and a signal collected through the microphone.

10. The electronic device of claim 9, wherein the processor is further configured to generate heat through the heat emitting structure when it is determined that moisture is introduced into an interior of the enclosure.

11. The electronic device of claim 1, further comprising:
    a sensor configured to collect state information of the electronic device, and
    wherein the processor is configured to control the heat emitting structure to generate heat based on the state information.

12. The electronic device of claim 11, wherein the sensor includes a gyro sensor, and
    wherein the processor is further configured to control the heat emitting structure to generate heat when an inclination of the electronic device is less than or equal to a specific value.

13. The electronic device of claim 1, wherein the enclosure comprises a material including at least one inorganic filler.

14. The electronic device of claim 13, wherein the inorganic filler includes at least one of boron nitride (BN), magnesium oxide (MgO), aluminum oxide ($Al_2O_3$), aluminum nitride (AIN), silicon carbide (SIC), Whisker™, Talc™, and Wallastonite™.

15. An electronic device comprising:
    an enclosure;
    a gyro sensor configured to collect state information of the electronic device;
    a processor in communication with the gyro sensor; and
    a heat transfer unit connected to an outer surface of the enclosure,
    wherein the processor is configured to control emission of heat based on the state information when an inclination of the electronic device is less than or equal to a specific value.

16. The electronic device of claim 15, further comprising:
    a heat transfer member disposed between the enclosure and the heat transfer unit.

17. The electronic device of claim 16, wherein the heat transfer member comprises a thermal interface material (TIM) tape or stainless steel (SUS).

18. An electronic device comprising:
    a speaker configured to output a sound signal;
    an enclosure surrounding the speaker;
    a processor configured to control increase of the temperature of the speaker by outputting a preset non-audible signal through the speaker when moisture is introduced into the enclosure;
    a first switch connecting a first input terminal of the speaker to a DC power source; and
    a second switch connecting a second input terminal of the speaker to a ground.

19. The electronic device of claim 18, wherein the processor is further configured to output the non-audible sound signal by controlling the first switch and the second switch.

* * * * *